United States Patent

Wallentin et al.

[11] Patent Number: 6,154,450
[45] Date of Patent: Nov. 28, 2000

[54] SIGNALING METHOD FOR CDMA QUALITY BASED POWER CONTROL

[75] Inventors: Bo Stefan Pontus Wallentin, Ljungsbro; Paul Peter Butovitsch, Bromma, both of Sweden

[73] Assignee: Telefonaktiebolaget LM Ericsson, Stockholm, Sweden

[21] Appl. No.: 08/916,440

[22] Filed: Aug. 22, 1997

[51] Int. Cl.[7] .............................. G08C 17/00; H04B 7/216
[52] U.S. Cl. ........................... 370/311; 370/335; 370/340; 455/522; 455/69
[58] Field of Search ..................................... 370/335, 340, 370/341, 342, 311, 328; 455/69, 522, 561, 517

[56] References Cited

U.S. PATENT DOCUMENTS

| | | |
|---|---|---|
| 5,287,544 | 2/1994 | Menich et al. . |
| 5,425,076 | 6/1995 | Knippelmier . |
| 5,442,681 | 8/1995 | Kotzin et al. . |
| 5,559,790 | 9/1996 | Yano et al. . |
| 5,566,209 | 10/1996 | Forsén et al. . |
| 5,581,548 | 12/1996 | Ugland et al. . |
| 5,603,096 | 2/1997 | Gilhousen et al. . |
| 5,619,525 | 4/1997 | Wiedeman et al. . |
| 5,621,723 | 4/1997 | Walton, Jr. et al. . |
| 5,623,484 | 4/1997 | Muszynski . |
| 5,623,486 | 4/1997 | Dohl et al. . |
| 5,640,414 | 6/1997 | Blakeney, II et al. . |
| 5,722,074 | 2/1998 | Muszynski ............................. 455/442 |
| 5,812,938 | 9/1998 | Gilhousen et al. ...................... 455/69 |
| 5,850,607 | 12/1998 | Muszynski ............................. 455/442 |

FOREIGN PATENT DOCUMENTS

| | | |
|---|---|---|
| 0 579 372 A2 | 1/1994 | European Pat. Off. . |
| 0 717 580 A2 | 12/1994 | European Pat. Off. . |
| WO 95/08876 | 3/1995 | WIPO . |
| WO 95/20283 | 7/1995 | WIPO . |

*Primary Examiner*—Ricky Ngo
*Attorney, Agent, or Firm*—Nixon & Vanderhye, P.C.

[57] ABSTRACT

A CDMA mobile telecommunications system comprises a base station (20) having a radio channel connection to a mobile station (22). The base station (20) determines a signal to interference/noise ratio (SINR) with respect to the signal received from the mobile station (22), compares the signal to interference/noise ratio (SNR) for the mobile station (22) with a target signal to interference/noise ratio (TSINR), and transmits a power level command to the mobile station (22) in accordance with the comparison. A mobile switching center (24) generates information for updating the target signal to interference/noise ratio (TSINR)and transmits the information for updating the target signal to interference/noise ratio (TSINR) to the base station (20) using in-band signaling.

8 Claims, 6 Drawing Sheets

SIGNALING METHOD FOR CDMA QUALITY BASED POWER CONTROL

BACKGROUND

1. Field of the Invention

This invention pertains to mobile telecommunications, and particularly to quality based power control in a code division multiple access (CDMA) mobile telecommunications system.

2. Related Art and Other Considerations

In general, a mobile telecommunications system or network includes numerous mobile stations, e.g., mobile telephones, which communicate over respective radio links or channels to a base station. The base station, which may include a base station controller, is typically connected by physical lines to a mobile switching station. The mobile switching station is often connected by physical lines to many base stations, as well as to other mobile switching stations. At least one, and usually several, mobile switching stations are connected to a gateway. The gateway interfaces the mobile communications system with a land-line (wired) communications system. Thus, when a non-mobile subscriber places a call to a mobile station, the call is directed to the gateway, and from the gateway through one or more mobile switching stations to the base station(s) which serve (s) the called mobile station. The base station employs a transceiver (e.g., transmitter and receiver) to page the called base station, ultimately resulting in the establishment of a connection when the mobile station responds.

In a code division multiple access (CDMA) mobile telecommunications system, the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997). Typically the same base band signal with suitable spreading is sent from several base stations with overlapping coverage. The mobile terminal can thus receive and use signals from several base stations simultaneously.

In general, a CDMA base station attempts to maintain the same received power level in communications with each mobile station that it currently serves. To this end, a base station measures the received signal from each of the mobile stations in order to determine a parameter known as the Signal to Interference and Noise Ratio (SINR). For each mobile station, the SINR is compared with a target value SINR. If the SINR measured for a particular mobile station is less than the target value SINR, the base station commands the mobile station to increase its power in order that a stronger signal can be received at the base station. On the other hand, if the SINR determined for the particular station is greater than the target value SINR, the base station requests the mobile station to decrease its power. Thus, a power control loop is established between the base station and the mobile station, with an uplink aspect of the power control loop involving the mobile station transmitting to the base station and with the base station, upon receiving the signal from the mobile station and comparing the SINR for the station with the target SINR, providing power control commands to the mobile station as a downlink aspect of the power control loop.

As it turns out, the target SINR must be continually updated for numerous reasons, e.g., increase and decrease of the number of mobile stations served by the base station. The updating of the target SINR typically is part of another control loop, in particular a quality control loop between the base station and the mobile switching center. In an uplink aspect of the quality control loop, the base station provides the mobile switching center with an indication of the quality of connection for each of the mobile stations currently served. The mobile switching center uses such quality indication in order to calculate or otherwise determine the updated SINR target value. The updated SINR target value is then transmitted to the base station on a downlink aspect of the quality control loop.

One example of a control technique such as that described above is set forth in Pat. No. 5,623,484 to Muszynski, which is incorporated herein by reference. In order to transmit information (including a signal to interference and noise ratio setpoint [SINR])) between the base station and mobile switching center, Muszynski employs a common channel signaling technique known as Signaling System No. 7.

In common channel signaling, the signaling for a number of user channels/connections is carried in any number of signaling channels/connections. Moreover, there is no static relation between signaling channels/connections and user data.

In CDMA systems, the SINR target values must be updated frequently. When common channel signaling is employed as in Muszynski for updating a SINR target value, the load on the link or line connecting the mobile switching center with the base station is greatly increased due to the updates. For example, sending one common channel signaling message of ten to fifteen octets at a rate of ten to twenty times per second generates an additional signaling load of between one thousand and fifteen hundred bits per second per mobile station.

What is needed, therefore, and an object of the present invention, is a simple technique for maintaining quality-based power control in a CDMA mobile telecommunications system.

SUMMARY

A CDMA mobile telecommunications system comprises a base station having a radio channel connection to a mobile station. The base station determines a signal to interference/noise ratio with respect to the signal received from the mobile station, compares the signal to interference/noise ratio for the mobile station with a target signal to interference/noise ratio, and transmits a power level command to the mobile station in accordance with the comparison. A mobile switching center generates information for updating the target signal to interference/noise ratio and transmits the information for updating the target signal to interference/noise ratio to the base station using in-band signaling.

In one mode of the invention, the information for updating the target signal to interference/noise ratio (TSINR) is carried in the header of traffic connection frame (TCF) packets, i.e., the packets whose payload carries e.g., user data. In such mode, the header of the TCF packets can either be dedicated to carrying the information for updating the target signal to interference/noise ratio (TSINR), or can carry other information as well. In another mode, the information for updating the target signal to interference/noise ratio (TSINR) is carried in in-band dedicated TSINR packets which are interspersed with traffic frame connection packets (TCFs).

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be air apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
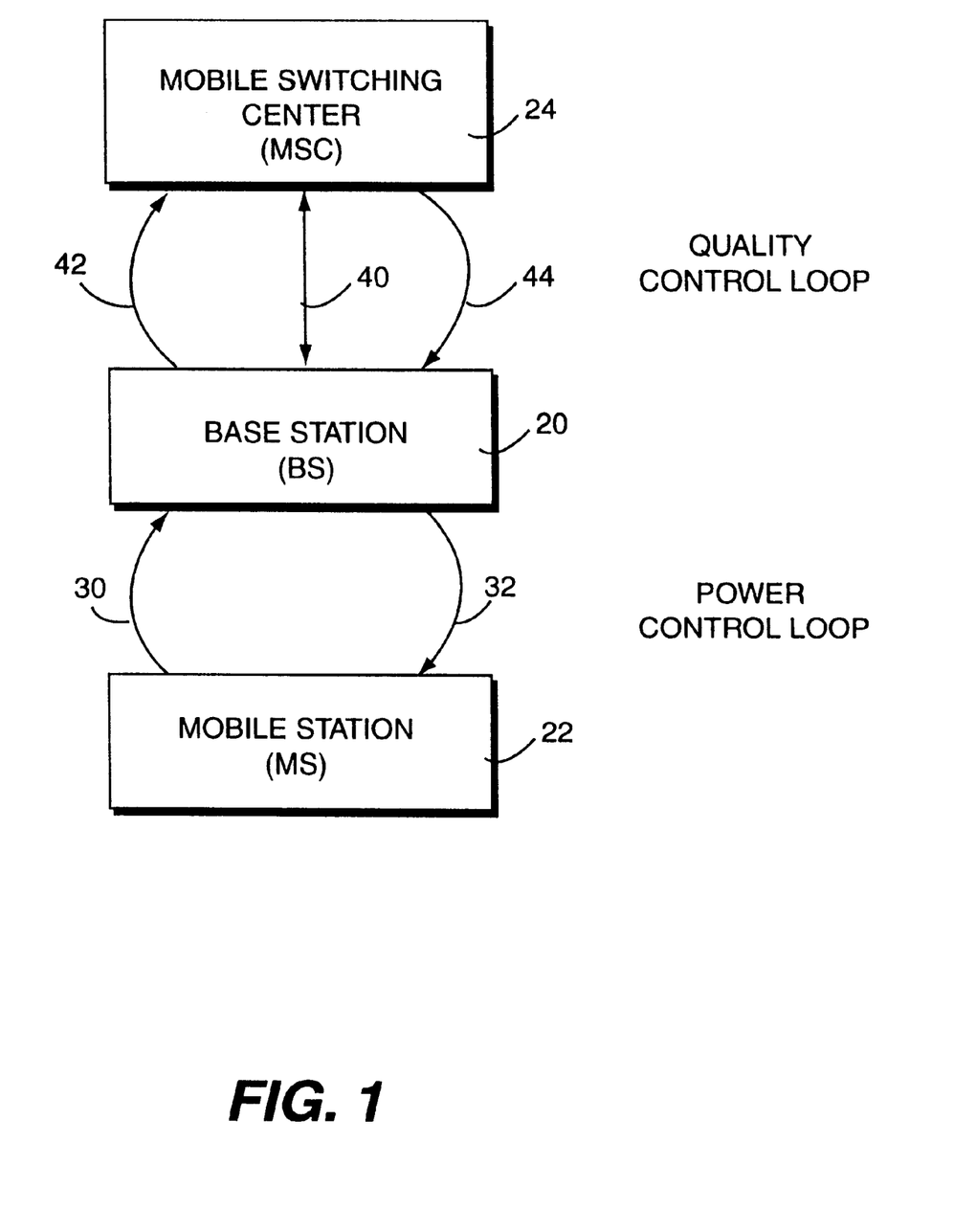
FIG. 1 is a schematic view showing a selected portion of a mobile telecommunications system.

FIG. 1 shows a portion of a mobile telecommunications system including base station (BS) 20; mobile station (MS) 22; and mobile switching center (MSC) 24. Mobile station 22 (which can be, for example, a mobile telephone) has a radio channel connection to base station 20. The radio channel connection includes both an uplink component 30 and a downlink component 32. Although not illustrated, it should be understood that base station 20 is similarly in radio communication with many other mobile stations. In the illustrated embodiment, since plural mobile stations served by base station 20 can utilize the same radio frequencies, code division multiple access techniques are employed to distinguish between the various mobile stations. In fact, unless otherwise noted, as used herein the term "channel" refers to CDM channel, which for any mobile station is defined in terms of an RF frequency and a particular code sequence.

Base station 20 is connected by a physical link 40 to mobile switching center (MSC) 24. Physical link 40 is typically a terrestrial line. In the illustrated embodiment, link 40 carries packets of data between base station 20 and mobile switching center (MSC) 24. Packets directed from base station 20 to mobile switching center (MSC) 24 are said to form an uplink 42 between base station 20 and mobile switching center (MSC) 24; packets directed from mobile switching center (MSC) 24 to base station 20 are said to form an downlink 44 between base station 20 and mobile switching center (MSC) 24.

It should be noted, in passing, that the functions of mobile switching center (MSC) 24 can also be performed by a base station controller (BSC). Indeed, sometimes a mobile switching center (MSC) 24 is referred to as a base station controller (BSC).

Figure 2:
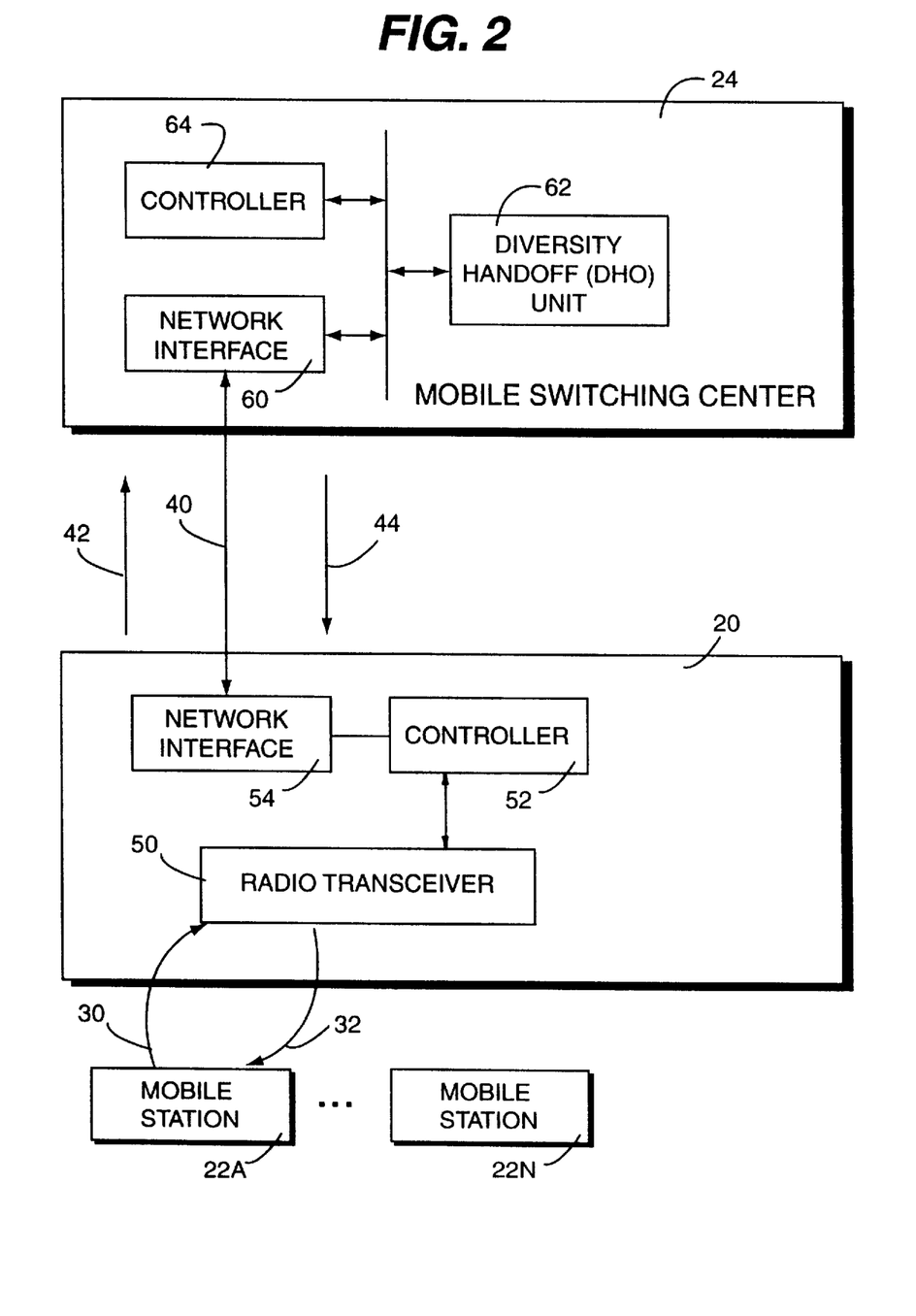
FIG. 2 is a schematic view showing the selected portion of the mobile telecommunications system of FIG. 1 in more detail.

FIG. 2 shows in more detail constituent units of base station 20 and mobile switching center (MSC) 24. As shown in FIG. 2, base station 20 includes radio transceiver(s) 50; controller 52; and, network interface 54. Base station 20 serves a geographical area known as a "cell" in which a plurality of mobile stations such as mobile stations 22A–22N may currently reside. In accordance with CDMA techniques, a particular mobile station 22 in the cell is able to decode only the portion of the signal transmitted from transceiver 50 which has been encoded by the code known to that particular station. Similarly, the information transmitted by each mobile station 22 to base station 20 is encoded with a unique code particular to that mobile station and recognizable by base station 20 as being attributed to that station. The portion of a signal over which the code associated with a particular mobile station enables that station to transmit or receive information relative to base station 20 is known as a "channel" for that station.

In base station 20, controller 52 conducts the coding and decoding of signals applied to and received from radio transceiver 50. The signals encoded by controller 52 are primarily those obtained over link 40 from mobile switching center 24. The signals decoded by controller 52 are primarily those destined for mobile switching center 24 over link 40. Network interface 54 is connected between controller 52 and link 40 in order to accommodate the transmission of signals between base station 20 and mobile switching center 24.

Mobile switching center 24 has its own network interface 60 connected to link 40. Network interface 60 is connected within mobile switching center 24 to diversity handoff (DHO) unit 62 and controller 64. Diversity handoff (DHO) unit 62 performs numerous functions, including but not limited to assisting the transition which occurs when a mobile station travels or roams into a cell handled by another base station. In addition, as hereinafter described, diversity handoff (DHO) unit 62 computes a target signal to interference/noise ratio (TSNR) for each base station for which the mobile switching center 24 is responsible.

Mobile switching center 24 is typically connected to a plurality of base stations for performing operations such as those above-described with respect to diversity handoff unit 62. In addition, mobile switching center 24 is usually connected to one or more other mobile switching centers comprising the mobile telecommunications network. At least one of the mobile switching centers of the mobile telecommunications network is connected to or forms part of a gateway to the wired portion of the public switched telephone network (PSTN). A call from a subscriber in the wired network or the mobile telecommunications network to mobile station 22A, for example, is eventually routed to mobile switching center 24, which connects the call through base station 20. Similarly, calls originated or dialed at mobile station 22A are detected at base station 20 and routed through mobile switching center 24 and possibly through one or more switches and even a gateway to the called party.

Figure 6:
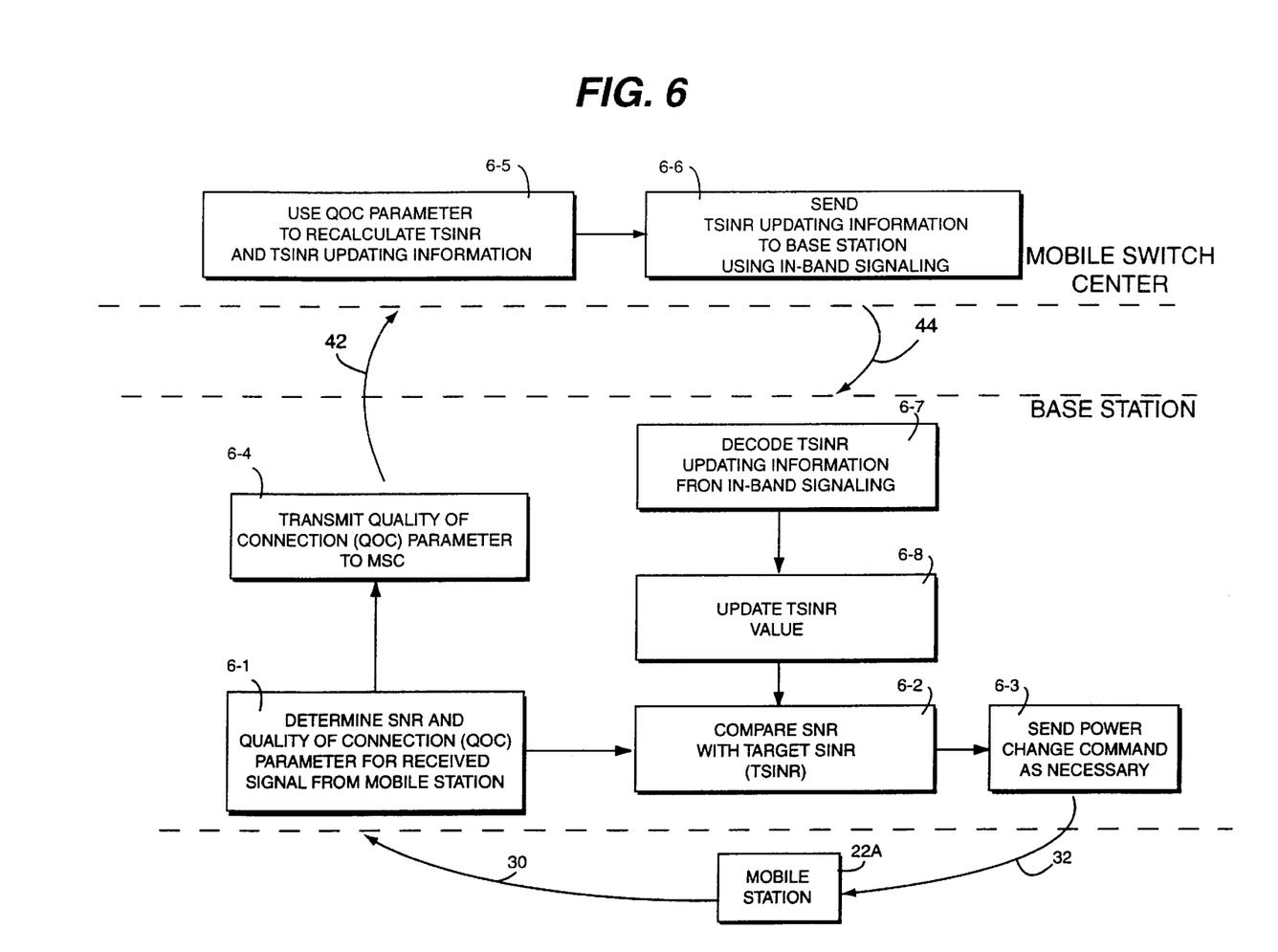
FIG. 6 is a diagram depicting various operations and functions performed by a base station and a mobile switching center in accordance with an example embodiment of the invention.

FIG. 6 show various operations performed by base station 20 and mobile switching center 24 in connection with an example embodiment of the invention. The operations and functions depicted by blocks or symbols shown in FIG. 6 are not necessarily performed in any sequence, it being understood (for example) that some operations can be performed by mobile switching center 24 while other operations are being performed by base station 20.

When a call involving mobile station 22A is in progress, the strength (i.e., received power) of the signal on the uplink from mobile station 22A to base station 20 is periodically monitored at base station 20. In this regard, radio transceiver 50 is periodically interrogated by controller 52 with respect to each channel (e.g., each mobile station) to ascertain the received power of the signal. Controller 52 thus knows the received power for all mobile stations served by base station 20. Accordingly, with respect to each mobile station such as mobile station 22A, as shown by operation 6-1 in FIG. 6, controller 52 determines a signal to interference/noise ratio (SINR). For mobile station 22A, for which ($SINR_{22A}$) is determined (e.g., measured), the signal part of the signal to interference/noise ratio ($SINR_{22A}$) is the received power of signal for the channel over which mobile station 22A operates; the interference/noise part the signal to interference/noise ratio ($SNR_{22A}$) includes the strength of the signals for all other mobile stations served by base station 20.

After determining the signal to interference/noise ratio for a mobile station such as mobile station 22A, at operation 6-2 of FIG. 6 controller 52 of base station 20 compares the signal to interference/noise ratio to a target signal to interference/noise ratio (TSINR) which is applicable to all channels (e.g., all mobile stations) operated at base station 20. If the comparison indicates that mobile station 22A needs to change (i.e., increase or decrease) power, controller 52 causes an appropriate power change command to be sent over downlink 32 to mobile station 22A (operation 6-3 of FIG. 6). Upon detection of the power change command, mobile station 22A responds by appropriately increasing or decreasing its transmit power.

In addition, for each mobile station which it serves, controller 52 of base station 20 determines a quality of connection (QoC) parameter (see operation 6-1 in FIG. 6). As indicated by operation 6-4, base station 20 periodically sends the quality of connection parameter over link 40 to mobile switching center (MSC) 24. The quality of connection (QoC) parameter can be any suitable value, such as the frame error rate (FER) or bit error rate (BER) for the channel. The quality of connection (QoC) parameter associated with each connection (e.g., each mobile station or each channel) is sent to diversity handoff unit (DHO) 62 of mobile switching center 24.

In view of factors such as the changing number of mobile stations being served by base station 20, the target signal to interference/noise ratio (TSINR) must be periodically updated. As mentioned above, the target signal to interference/noise ratio (TSINR) is updated by diversity handoff (DHO) unit 62 of mobile switching center 24, as indicated by operation 6-5 in FIG. 6. As depicted by operation 6-6, the TSINR updating information is communicated to controller 52 of base station 20 over link 40 using in-band signaling in the manner hereinafter described.

Figure 5:
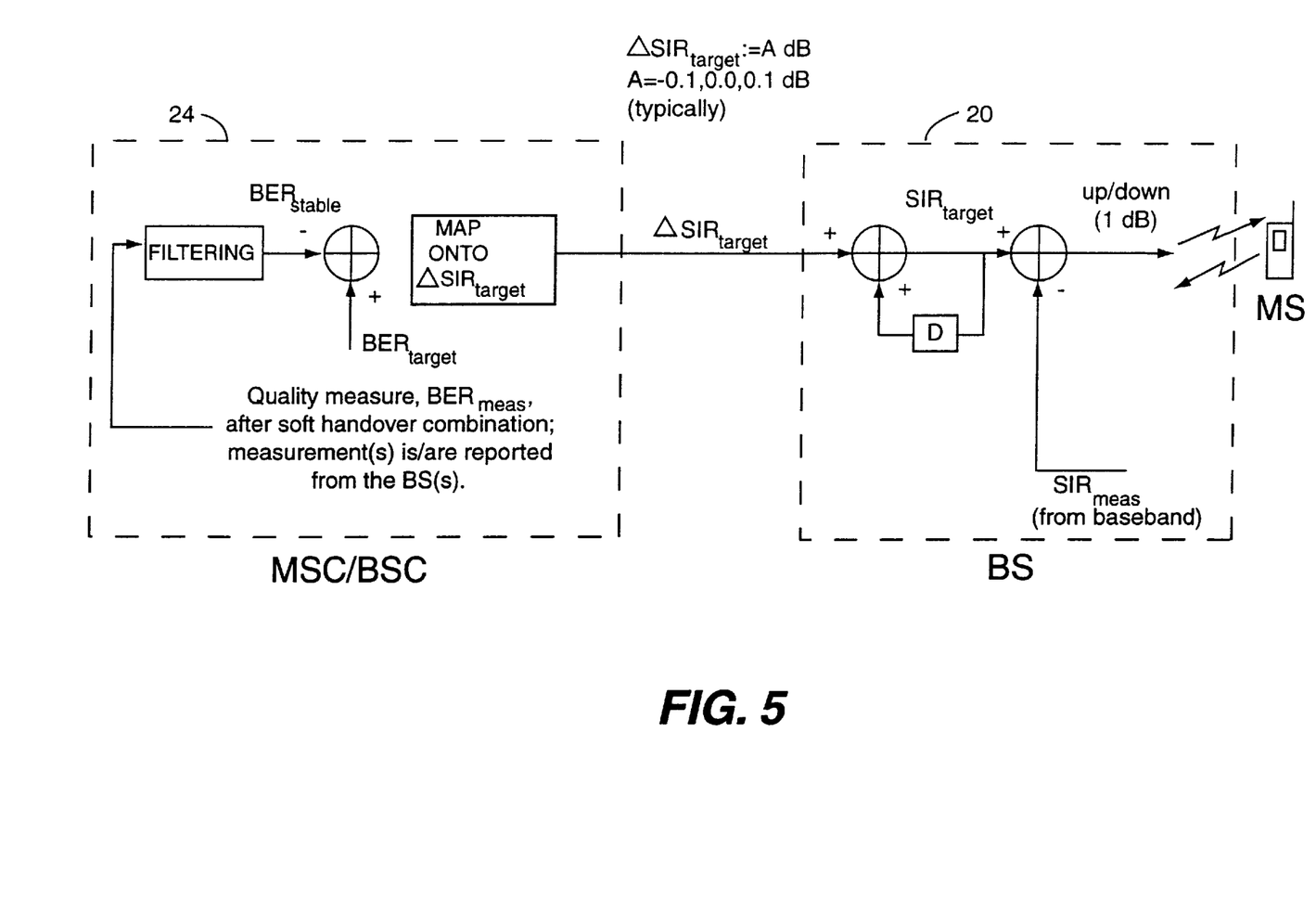
FIG. 5 is a diagrammatic view showing how a diversity handoff unit determines TSINR updating information.

Diversity handoff (DHO) unit 62 of mobile switching center 24 uses information including the quality of connection parameters in order to determine whether the target signal to interference/noise (TSINR) should be changed from one value to another value. For example, either periodically or a periodically diversity handoff (DHO) unit 62 can recalculate the TSINR. According to one mode of the invention in which BER values are utilized as the Quality of Connection (QoC) parameter, BER values corresponding to the frames to which they are attached are filtered over some time so that a stable BER value is obtained. Such mode is illustrated in FIG. 5. This filtered or stable BER value is compared to a target BER value. Depending on whether the filtered BER value is greater than or less than the target BER value, the TSINR is either decreased, increased, or remains unchanged. A simple technique is to increase or decrease the TSINR with a fixed (set by system configuration) amount. In FIG. 5, the TSINR updating information is represented by $\Delta SIR_{target}$. In the FIG. 5 embodiment, the filter for obtaining a stable BER value can be, for example, either an infinite impulse (IIR) filter or a finite impulse filter (FIR), or a combination thereof. The length of the filter and the filter parameters are chosen by the operator in accordance with calculations with which the person skilled in the art is familiar.

In accordance with the present invention, using in-band signaling mobile switching center (MSC) 24 sends to base station 20 certain information for updating the target signal to interference/noise ratio (TSINR). In particular, the information for updating the target signal to interference/noise ratio (TSINR) indicates one of the following: (1) whether the target signal to interference/noise ratio (TSINR) is to be increased; (2) whether the target signal to interference/noise ratio (TSINR) is to be decreased; or (3) whether the target signal to interference/noise ratio (TSINR) is to remain unchanged.

In accordance with one mode of the invention, the information for updating the target signal to interference/noise ratio (TSINR) constitutes two bits which are transmitted over link 40 to base station 20. The two bits provide four values, three of which are employed for the indications listed in the preceding paragraph. For example, a two bit value "01" can indicate a desired increase in TSINR; a two bit value "10" can indicate a desired decrease in TSINR; a two bit value "00" can indicate no change in TSINR. Of course, other numbers of bits, and other bit assignments are possible and are contemplated by the present invention.

As shown by operation 6-7 in FIG. 6, base station 20 receives and decodes the in-band signaling which includes the TSNR updating information. Then, as indicated by operation 6-8, controller 52 of base station 20 uses the TSNR updating information to update the TSNR value. It is thus the updated TSNR value that is utilized for the comparison with SNR at operation 6-2 as previously described.

As indicated above, in-band signaling is utilized for transmitting the information for updating the target signal to interference/noise ratio (TSINR) over link 40 from mobile switching center 24 to base station 20. "In-band" refers to the fact that the signaling is carried in the same channel/connection as the user information (e.g., digital voice). In the packet mode cases herein illustrated, this means that the packets carrying the TSINR updating information have the same address as packets which carry user data. In the more specific cases of ATM/AAL2 herein illustrated, this specifically means that the AAL2 connection identifier (CID) in the AAL2 packet header is the same for packets carrying the TSINR updating information as for packets carrying user data. Thus, in "inband" signaling, resources are shared between user data and signaling. In the modes and embodiments described herein, the TSINR updating information is sent on the same channel/connections as the user data.

In the embodiments described herein, essentially all information is transmitted over link 40 in the form of packets.

One illustrative packetized mode of transmission is asynchronous transfer mode (ATM). ATM is a packet-oriented transfer mode which uses asynchronous time division multiplexing techniques. Packets are called cells and have a fixed size. An ATM cell or packet typically consists of 53 octets, five of which form a header and forty eight of which constitute a "payload" or information portion of the cell.

Figure 3:
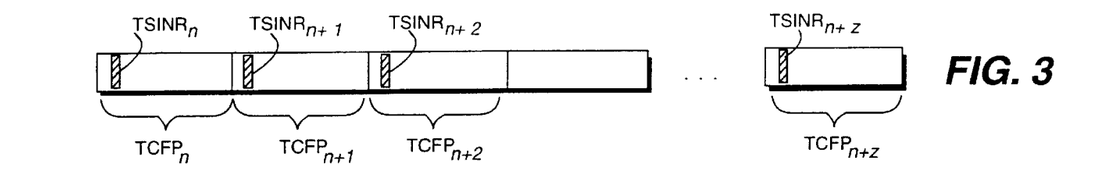
FIG. 3 is a diagrammatic view showing in-band signaling in the form of traffic connection packets carrying information for updating TSINR in accordance with one mode of the invention.

Using packetization such as ATM, in one embodiment of the invention illustrated in FIG. 3, link 40 carries traffic connection frame packets $TCFP_n$ through $TCFP_{n+z}$. In the embodiment of FIG. 3, the information for updating TSINR is carried in each of the traffic connection frame packets $TCFP_n$ through $TCFP_{n+z}$, as represented by $TSINR_n$ through $TSINR_{n+z}$ for packets $TCFP_n$ through $TCFP_{n+}$, respectively. Since all traffic connection frame packets for a certain h mobile station MS 22 have the same address (i.e., channel/ connection), the signaling (information for updating TSINR represented by $TSNR_n$ through $TSINR_{n+z}$) is in-band with respect to the user data for that mobile station. Differing mobile stations MS have differing connections, and thus differing addresses, with the results that the traffic connection frames have addresses which differ from one mobile station to the other. However, all traffic connection frame packets relating to one specified mobile station (such as mobile station $22_A$) have the same address.

Figure 3A:
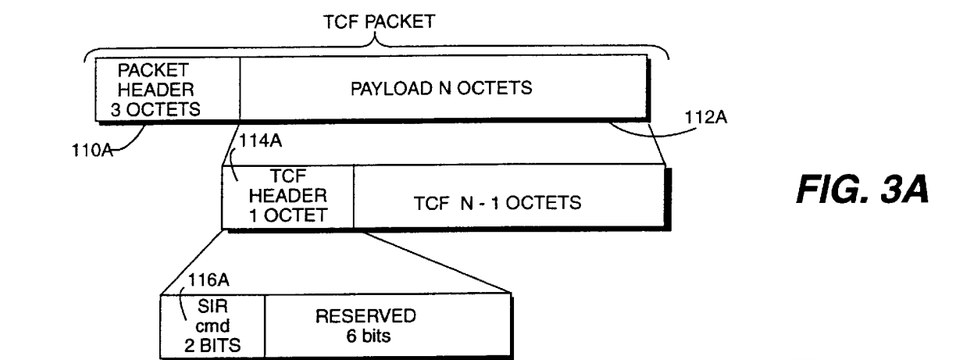
FIGS. 3A and 3B are diagrammatic views showing the formats and differing contents of traffic connection packets carrying the information for updating TSINR.
Figure 3B:
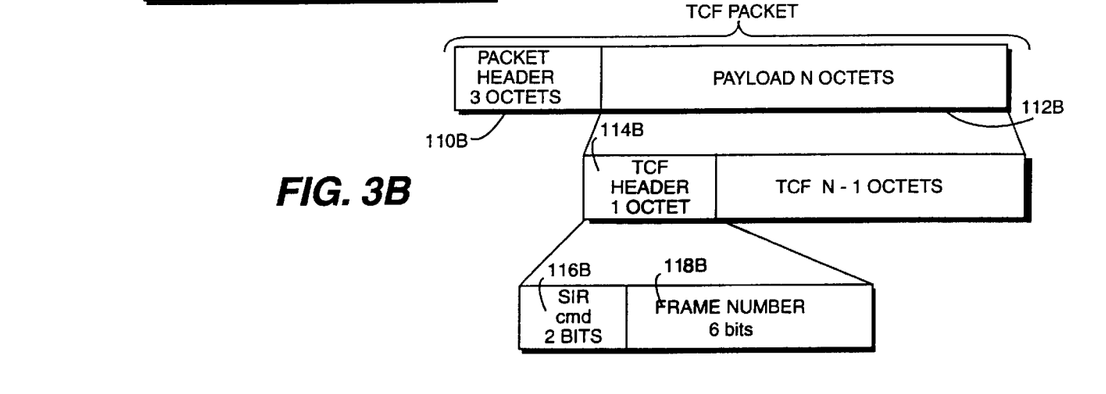

Concerning the embodiment of FIG. 3, the information for updating TSINR is carried in a header portion of a traffic connection frame. As shown in FIG. 3A and FIG. 3B, respectively, the header of the TCF packets can either be dedicated to carrying the information for updating the target signal to interference/noise ratio (TSINR), or can carry other information as well.

FIG. 3A and FIG. 3B thus provide two examples of how information for updating the target signal to interference/ noise ratio (TSINR) can be formatted in the in-band traffic connection frame packets (TCFP) of FIG. 3. FIG. 3A shows a format of a traffic connection frame packet (TCFP) as including a packet header 110 and a packet payload 112. Packet header 110A is the ATM AAL-2 header which (in one example embodiment) comprises three octets. Packet payload 112, sometimes referred to as the traffic connection frame (TCF) 112A, carries N octets. Traffic connection frame (TCF) 112A has a TCF header 114A, which is shown in the example of FIG. 3A as being one byte. TCF header 114A has a field 116A which includes the information for updating TSINR in two bit format, as above discussed. For example, a two bit value "01" can indicate a desired increase in TSINR; a two bit value "10" can indicate a desired decrease in TSINR; a two bit value "00" can indicate no change in TSINR. The remainder of TCF header 114A can be unused or reserved.

The TCF packet of the embodment of FIG. 3B differs from that of FIG. 3A in that TCF header 114A is not dedicated to the information for updating TSINR. Rather, TCF header 114A has a field 118B which can be used to store other information. In one example illustration shown in FIG. 3B, field 118B is used to store a frame number (six bits). Other pertinent values can also be stored in field 118B, such as (for example) a checksum on user data.

The in-band traffic connection frame packets (TCFP) 100 of FIG. 3 are particularly suitable when no information other than TSNR updating information is to be sent in the TCFP header. The traffic connection frame packet (TCFP) of FIG. 3B, on the other hand, is useful when there is additional information that is to be sent in the TCFP header.

The signaling load for the SINR for the FIG. 3A embodiment is typically 8/0.01 or 800 bits per second. The signaling load for the SINR for the FIG. 3B embodiment is typically 2*100 or 200 bits per second.

Although FIG. 3A and FIG. 3B show the TCF headers 114A and 114B as being situated at the beginning of the traffic connection frames 112A and 112B, respectively, it should be understood that such TCF headers can also be placed at the end of the traffic connection frames. Moreover, particularly in connection with the embodiment of FIG. 3B, it should be understood that the TCF header can be more than one octet in length, particularly when additional information is to be included therein.

Figure 4:
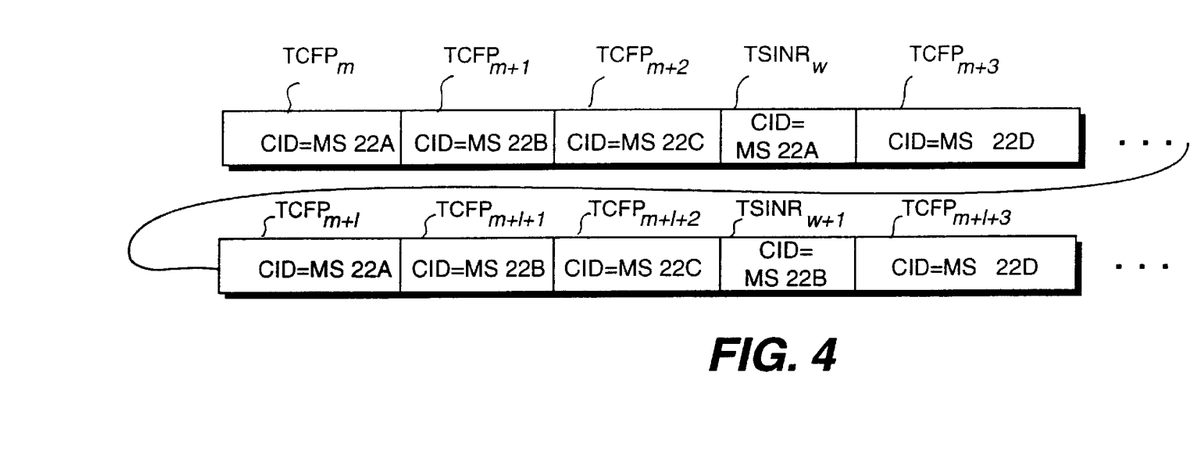
FIG. 4 is a diagrammatic view showing in-band signaling in the form of TSINR command packets interspersed with traffic connection packets in accordance with one mode of the invention.

In another mode, the information for updating the target signal to interference/noise ratio (TSINR) is carried in in-band, dedicated TSINR packets which are interspersed with traffic frame connection packets (TCFs). As shown in FIG. 4, traffic frame connection packets $TCFP_m$, $TCFP_{m+1}$, ... are transmitted on link 40. Interspersed with traffic frame connection packets $TCFP_m$, $TCFP_{m+1}$, ... are TSINR command packets, shown as $TSINR_w$, $TSINR_{w+1}$, ... In the mode of FIG. 4, the TSINR command packets $TSINR_w$, $TSINR_{w+}$, ... are sent less frequently than, for example, the traffic connection frame packets of FIG. 3A and FIG. 3B. For example, the TSINR command packets $TSINR_w$, $TSINR_{w+1}$, ... are sent on the order of one to ten times per second. Since the TSINR command packets $TSINR_w$, $TSINR_{w+1}$, ... carry the same address as the traffic frame connection packets TCFP, the TSINR command packets $TSINP_w$, $TSINR_{w+1}$, ... provide in-band signaling.

As mentioned above, in the embodiments of FIG. 3A and FIG. 3B the information for updating the TSINR is chosen to be two bits, for example, to indicate an increase, decrease, or no change of an existing TSINR value at base station 20. In simple embodiments, when an increase or decrease in TSINR is required, the a field containing information for updating the TSINR serves to increase or decrease the TSINR value by one unit. In such embodiments, the increases and decreases of the TSINR value per request are uniform in magnitude. In other embodiments in which the information for updating the TSINR is expressed with more bits, some of the bits of the updating information may serve to indicate a magnitude of the increase or decrease (e.g., number of units). In such other embodiments, the magnitude of the TSINR increases or decreases per request are thus not necessarily uniform.

It should be noted in passing an initial TSINR value for base station 20 is determined by mobile switching center 24 at the set up of the call. The value of the initial TSINR for a call depends on the user data rate and the type of service (e.g., circuit, packet). The value of the initial TSINR is sent to base station 20 using any type of channel (and typically is included in a channel setup message sent on a common channel signaling connection).

Figure 4A:
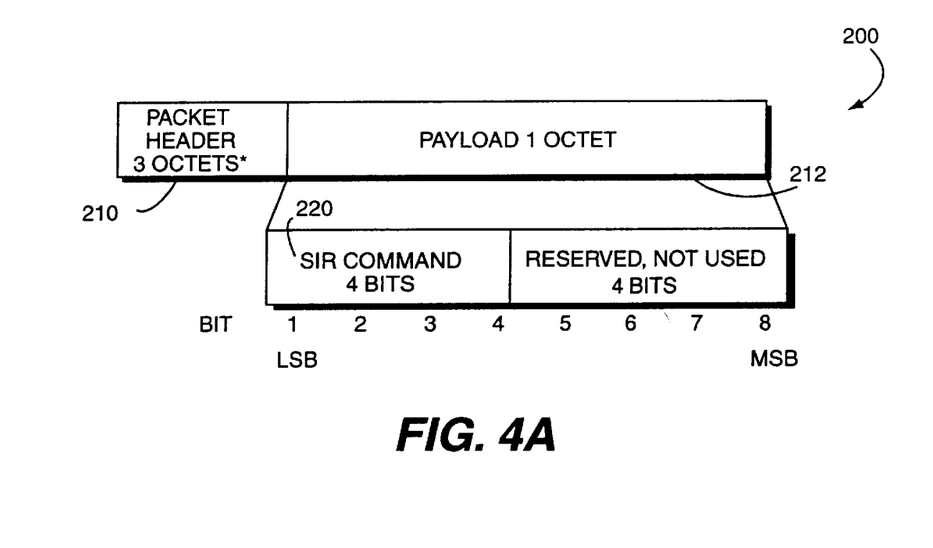
FIG. 4A is a diagrammatic view showing the format of a TSINR command packet for the mode of FIG. 4.

FIG. 4A shows an example format of TSINR command packets carry TSINR commands as messages in the inband signaling link for the connection to base station 20. In particular, FIG. 4A shows an example of how information for updating the target signal to interference/noise ratio (TSINR) can be formatted in the in-band SINR command packets $TSINR_w$, $TSINR_{w+1}$, ... of FIG. 4. In the illustrated example, each of the SINR command packets $TSINRM_w$, $TSINR_{w+1}$, ... has a packet header 210 (three octets) and a one-octet payload 212. Depending on frequency of transmission, four or five of the bits in payload 212 are utilized for the SINR updating command. In the particular example illustrated, the four least significant bits (referenced as field 220 in FIG. 4) in payload 212 are utilized for the SINR command. It should be understood that other bits of the payload can instead be selected for the SINR command.

Moreover, the TSINR command packet can include more information as well. Depending on the amount of information to be carried in the TSINR command packet, more than one octet may be utilized. In the TSINR command of FIG. 4A, the information transmitted in field 220 is not a change value (i.e., increase, decrease, no change), but instead an actual numeric TSINR value. In a five bit TSINR command format, such would permit thirty two distinct states or levels of TSINR.

Likewise in connection with the mode of FIG. 4 it should be understood that traffic connection frame packets and TSINR command packets for the same mobile station have the same address (e.g., same CID in ATM parlance). Differing mobile stations have differing addresses (i.e., channels/connections), but for each mobile station the TSINR command packets and traffic connection frame packets have the same address (e.g., CID).

The example of FIG. 4 features a compact (minimum address overhead). The signaling load for the SINR for the FIG. 4 embodiment is typically 32*5 or 160 bits per second.

In FIG. 3A, FIG. 3B, and FIG. 4A, it should be understood that respective headers 110A, 1103B, and 210 refer to the AAL-2 header. The ATM layer overhead (not illustrated) includes another approximately one or two octets per AAL2 packet, depending on the size of the AAL2 packets.

The packet mode of the present invention can be of any type, e.g., frame relay (Q.922) and ATM/AAL-2 or ATM/AAL5 (see ITU-T and ATM Forum VTOA).

It should be understood that the phrase "information for updating the target signal to interference/noise ratio" is not intended to be limited to indications of whether the TSINR should be increased, decreased, etc., but also encompasses the transmission of a new TSINR value to the base station. An example is the TSINR command 220 in field 220 of FIG. 4A, as above described.

In an ATM/AAL2 environment, as many as two hundred fifty five connections can be multiplexed on the same ATM virtual channel connection. The actual number implemented typically depends on the user rates of the different packet mode channels and the bandwidth of the ATM VCC.

Advantageously, in the present invention DHO 62 of mobile switching center 24 receives the quality of connection (QoC) parameters, handles the in-band signaling, and determines the information for updating the TSINR. Having DHO 62 handle these functions is more expeditious and less expensive than having controller 64 (which handles common channel signaling communication) involved with these functions.

In one mode of the invention, the quality of connection (QoC) parameters transmitted on uplink 42 from base station 20 to mobile switching center 24 are also transmitted using in-band signaling. The quality of connection (QoC) parameters transmitted on uplink 42 can be included (in the FIG. 3 embodiment) in TCF headers such as headers 114A and 114B, for example, or (in the FIG. 4 embodiment) in the payload of the TSINR command packet. Since expression of the the quality of connection (QoC) parameter requires more than two bits, e.g., four or five bits, it should be understood that, on uplink 42, the sizes of fields 116A and 116B in headers 114A and 114B, respectively, are appropriately increased.

The present invention thus imposes lower signaling load on the link between a base station and a mobile switching center. With a lower signaling load, there is less delay and consequentially a better working quality control algorithm. Concomitantly, the present invention features lower processing load since there is lower message complexity.

Thus, in accordance with the present invention, fewer signaling link functions are required. No acknowledgments are needed on the command which result in lower signaling and processing load. The present invention allows for compensation even if a few SINR commands do not reach the base station.

Moreover, the inband signaling of the present invention can also be used for other information and control signals needed to be sent at a high frequency between the base station and the mobile switching station.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile telecommunications system comprising:
    a base station having a radio channel connection to a mobile station using code division multiple access, the base station receiving a signal transmitted from the mobile station and determining a signal to interference/noise ratio therefor, making a comparison of the signal to interference/noise ratio for the mobile station with a target signal to interference/noise ratio, and transmitting a power level command to the mobile station in accordance with the comparison;
    a mobile switching center which is connected over a link to the base station, the mobile switching center generating information for updating the target signal to interference/noise ratio (TSINR) and transmitting the information for updating the target signal to interference/noise ratio to the base station over the link using in-band signaling, the link cog traffic connection frame packets of information having payloads which include user data, and wherein the information for updating the target six to interference/noise ratio is stored in the traffic connection frame packets.

2. The system of claim 1, wherein each of the in-band traffic connection packets has a traffic connection frame, and wherein the information for updating the target signal to interference/noise ratio is included in a header of the traffic connection frame.

3. The system of claim 1, wherein the information for updating the target signal to interference/noise ratio indicates one of the following: (1) an increase in target signal to interference/noise ratio; (2) a decrease in target signal to interference/noise ratio; and (3) no change in target signal to interference/noise ratio.

4. The system of claim 1, wherein the information for updating the target signal to interference/noise ratio comprises one of (1) a target signal to interference/noise ratio value and (2) a magnitude increase or decrease for the target signal to interference/noise ratio.

5. A method of operating a mobile telecommunications system, the method comprising:
    establishing a radio channel connection between a base station and a mobile station using code division multiple access;
    receiving at the base station a signal transmitted from the mobile station and determining a signal to interference/noise ratio therefor;

making a comparison of the signal to interference/noise ratio for the mobile station with a target signal to interference/noise ratio;

transmitting a power level command to the mobile station in accordance with the comparison; and generating, at a mobile switching center, the target signal to interference/noise ratio and transmitting the target signal to interference/noise ratio to the base station over the link using in-band signaling. the link carrying traffic connection frame packets of information having payloads which include user data, and wherein the information for updating the tarot signal to interference/noise ratio is stored in the traffic connection frame packets.

6. The method of claim 5, wherein each of the traffic connection packets has a traffic connection frame, and wherein the information for updating the target signal to interference/noise ratio is included in a header of the traffic connection frame.

7. The method of claim 5, wherein the information for updating the target signal to interference/noise ratio indicates one of the following: (1) an increase in target signal to interference/noise ratio; (2) a decrease in target signal to interference/noise ratio; and (3) no change in target signal to interference/noise ratio.

8. The method of claim 5, wherein the information for updating the target signal to interference/noise ratio comprises one of (1) a target signal to interference/noise ratio value and (2) a magnitude increase or decrease for the target signal to interference/noise ratio.

* * * * *

UNITED STATES PATENT AND TRADEMARK OFFICE
CERTIFICATE OF CORRECTION

PATENT NO. : 6,154,450                                                                                      Page 1 of 1
DATED : November 28, 2000
INVENTOR(S) : Wallentin et al.

It is certified that error appears in the above-identified patent and that said Letters Patent is hereby corrected as shown below:

<u>Column 10,</u>
Line 39, change "cog" to -- carrying --;
Line 42, change "six" to -- signal --.

<u>Column 11,</u>
Line 12, change "tarot" to -- target --.

Signed and Sealed this

Twelfth Day of March, 2002

Attest:

Attesting Officer

JAMES E. ROGAN
Director of the United States Patent and Trademark Office